Patented Feb. 22, 1944

2,342,620

UNITED STATES PATENT OFFICE 2,342,620

AZO-REVERSAL PROCESS OF COLOR PHOTOGRAPHY

David W. Woodward, Wilmington, Del., assignor to E. I. du Pont de Nemours & Company, Wilmington, Del., a corporation of Delaware No Drawing. Application July 10, 1942,
Serial No. 450,403

10 Claims. (Cl. 95—2)

This invention relates to color photography and methods for obtaining natural color photographic images in azo dyes. More particularly it relates to multilayer photographic film elements and process for producing azo dye images in such elements, involving the use of dye intermediates which are immobile in colloid layers and substituted nitrodiazonium compounds.

The formation of azo dye images in multilayer photographic film element utilizing immobile dye intermediates is known. Such processes involve color coupling development of certain image areas, for example, latent image areas and azo coupling reactions in the remaining image areas. The dyes formed by color coupling development can be converted into colorless or into removable compounds prior to or subsequent to azo coupling. One of the difficult features of such processes is to secure all of the colors necessary for natural color reproduction from these colorless dye intermediates and a single diazonium compound.

This invention has for an object the reproduction of a natural color scene in azo dyes. A further object is to provide a plurality of immobile dye intermediates capable of forming a dye on color coupling development with a primary aromatic amino developing agent and which will couple with a single diazonium compound to reproduce a natural color scene. A further object is to produce a multilayer film containing such immobile dye intermediates in respective water permeable colloid layers which will form simultaneously three subtractive primary colors. Another object is to provide an improved step of forming azo dye images in a multilayer film. Still other objects will be apparent from a consideration of the hereinafter described invention.

The light sensitive photographic element of this invention bears three silver halide emulsion layers which are so arranged and sensitized that they are sensitive respectively to blue, green, and red wave lengths of light. The blue sensitive layer is situated in operative contact with an immobile yellow azo dye intermediate which is also capable of forming a quinoneimine or azomethine dye on color forming development with an aromatic primary amino developing agent, and which is taken from the group consisting of phenols and compounds containing a reactive methylene group, containing a group or component which is of such constitution or molecular weight that it is fast to diffusion in colloid layers. The green sensitive emulsion layer is maintained in operative contact with an immobile magenta azo dye intermediate which is also capable of forming a quinoneimine or azomethine dye on color coupling development with an aromatic primary amino developing agent, and which is taken from the class consisting of N-alkylanilines, naphthols and naphthylamines which contain a group or component which is of such constitution or molecular weight that the compounds become fast to diffusion in water permeable colloid layers. The red sensitive emulsion layer is maintained in operative contact with an immoblie blue-green azo dye intermediate taken from the class consisting of N-alkylated-2-substituted-1-naphthylamines, N-alkylated-1-amino-5-, or 8-naphthols. Said compounds contain a further group or component of such molecular weight or constitution that it renders the compounds fast to diffusion in emulsion layers.

Preferably, the film element contains as three immobile dye intermediates (1) a phenol or an active methylene compound taken from the class consisting of pyrazolones and acetoacetamides, (2) a 1-naphthylaminesulfonic acid, and (3) a 1-N-alkylamino-5-, or -8-naphtholsulfonic acid. The immobile color formers may be dispersed in the water permeable colloid binding medium in admixture with the silver halide, or maintained in a separate layer adjacent to a silver halide layer, or separated therefrom by a thin water permeable colloid layer.

In order to convert the immobile dye intermediates into the three subtractive primary colors, i. e., yellow, magenta, and blue-green, the film is treated with a diazonium solution derived from a 4-nitroaniline containing a substituent in the 2-position. To be more specific, said 2 substituent is an atom or has directly attached thereto an atom having in its outer electron shell at least four electrons which are unshared with another atom. Such substituents are members of the class consisting of halogen, e. g., chlorine, bromine, trifluoromethyl, nitro, carboxyl, sulfonic, and alkoxyl. These groups have been found to increase the brilliance of the dyes and, by shifting the absorption band of the spectrum to longer wave lengths, decrease the red transmission of the blue-green dyes.

The element is exposed to a natural color scene or printed with white light through a color record or color transparency, or printed with colored light from suitable color separation records. The exposed film can then either be developed with a color forming developing agent, e. g., an aromatic primary amino developing agent, or it can be developed in a non-color forming developing agent first, the undeveloped silver salts fixed out, and the silver images bleached to reducible silver salts which are then developed in such a color forming developing agent. The photographic element is then further processed by carrying out the two main steps: (1) reacting with a diazonium compound derived from 2-substituted-4-nitroaniline as described above to form azo dye images in the areas where no color coupling development has taken place, and (2) decolorizing the formed azomethine and/or quinoneimine (including indophenol, indoaniline, and indamine) dyes. The order in which these steps are carried out is immaterial. When the color developed dye images require a vigorous treatment for decolorizing, it is preferable to do this before carrying out an azo dye formation. The silver image may be bleached and fixed at any stage subsequent to color development.

The most difficult mono-azo dyes to produce from two essentially colorless intermediates are the minus reds (blue-greens) which absorb substantially all visible light of wave length greater than 580 millimicrons and transmit at least 60% of the visible light of wave length less than 555 millimicrons. Many of the available dyes in this class transmit much red light, as their absorption band is not extended far enough into the long wave length of visible light, and such colors are of no value in three-color photography. As an example, the polymeric styrene maleic acid amide of 1-N-p-aminophenoxy-ethylamino-5-napthol of Example III of Kirby and Woodward application Serial No. 395,496, filed May 27, 1941, when coupled in acid solution produces an azo dye of the following type:

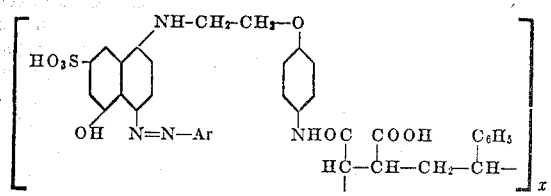

which ranges in shade from red-blue to blue-green depending on the structure of the nucleus Ar.

When Ar is benzene, the absorption is in the green wave lengths 500 to 600 millimicrons and the color becomes red-purple, while when Ar is a nitrophenyl group the absorption curve is shifted to longer wave lengths in the range of 525–625 millimicrons and the dye transmits blue along with some green and a considerable amount of red. The introduction of a 2-substituent having the electronic structure and characteristics set forth above and especially a chlorine atom or a nitro group ortho to the azo group has a further bathochromic effect, i. e., shifts the absorption to longer wave lengths around 580 to 680 millimicrons, resulting in high blue and green transmission and high red absorption which is required of the blue-green primary in three-color subtractive photography.

It has also been discovered that magenta dyes having maximum absorption at 555 millimicrons are similarly prepared using as the coupling component an immobile 1- or 2-naphthylamine. Yellow azo dyes absorbing all visible light of wave length shorter than 490 millimicrons are prepared using as coupling components immobile active methylene compounds such as high molecular weight pyrazolones and acetoacetanilides as well as phenols.

It is desirable to have in the coupling component nucleus substituents which are known by the dye chemist to have special effects on the coupling component nucleus to produce the most accurate dyes. Thus, sulfonic acid groups in the coupling component nucleus enhance the brilliance of the color and, in addition, improve the fastness characteristics. Other groups such as halogen, alkoxyl, carboxyl, nitro, alkyl, etc., when properly located in the coupling component nucleus as, for example, ortho to a coupling directive group in an aromatic nucleus, often improve the spectral characteristics of these dyes. To obtain the correct shade of blue-green from 1-amino-5, or -8-naphthol intermediates it is almost always necessary to have one of the amine hydrogen atoms replaced by an alkyl radical or substituted alkyl. These alkyl radicals may be or may have substituents, e. g., hydrocarbon radicals of high molecular weight, e. g., at least 10 carbon atoms, as such groups will render the molecule immobile. The prevention of coupling ortho to the amine group by use of a coupling component containing a blocking group in the 2-position is also of aid in increasing the color brilliance. Such dye intermediates are described in copending application Serial No. 395,496, filed May 27, 1941.

For use in the color process of application Serial No. 335,416, now U. S. P. 2,297,732, it is necessary that the coupling component contain a member of the following class: reactive methylene, phenolic hydroxyl, primary, or secondary amino group, with a coupling position available so that coupling may occur, during chromogenic development, with the oxidation product of the primary aromatic amino developing agent. Suitable compounds of this type are disclosed in said application.

For use in this azo dye process it is necessary that these coupling component nuclei be made immobile in the film element, i. e., they must resist migration between emulsions during photographic processing and they must not be leached out of a film element by aqueous solution. In the preferred embodiment of this invention these immobile dye intermediates are aqueous-soluble colloids which will dissolve to the extent of at least 0.5% in 5% aqueous sodium carbonate solution at 25° C. This solubility is desirable as it furnishes an easy method for incorporation of the dye intermediate in the film element and permits the formation of a gelatin dye intermediate compatible film which is transparent and gives rise to clear, bright dyes, such as often are not obtained when less solubl intermediates are used.

The methods of forming such immobile dye intermediates are well known in the art, having been the subject of numerous patents and patent applications. Suitable methods are described in U. S. application Dorough and McQueen, Serial No. 233,480, filed October 5, 1938, now U. S. P. 2,310,943; Kirby, Serial No. 301,041, filed October 24, 1939; Hanford, Kirby and Woodward, Serial No. 301,070, filed October 24, 1939, now U. S. P. 2,304,820; Kirby and Woodward, Serial No. 395,496, filed May 27, 1941; and United States Patents 2,166,181; 2,178,612; 2,179,228; 2,179,238; 2,179,239; 2,179,244; 2,186,719; 2,186,731; 2,186,732; 2,186,733; 2,186,734; 2,186,849; 2,186,851; 2,186,852; 2,200,924; 2,213,986, and 2,220,908. Suitable methods can be chosen from these or any other known source for the immobilization of the dye intermediate nuclei chosen in this invention.

The invention will be further illustrated by the following example in which all parts are by weight but it is not intended to be limited thereby:

*Example.*—To three silver halide-gelatin emulsions containing 10–12% solids by weight, being balanced as to speed and having different color sensitivities which include the entire visible spectrum are added three different azo dye intermediates which are further capable of color forming development as follows:

(1) To 100 parts of a red-sensitive silver-iodobromide emulsion sensitized with 3-ethyl-alpha-naphthselenocarbocyanine-3'-ethiodide is added 10 parts of a water solution of 1.6 parts of the sodium salt of the blue-green azo dye intermediate of the following probable structure:

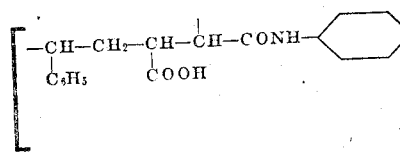
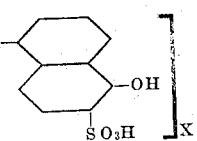

the preparation of which is given in application Serial No. 395,496, filed May 27, 1941.

(2) To 100 parts of a green-sensitive silver bromide (iodide) emulsion sensitized with 3:1'-diethyl-5-methyl-6' methoxy-benzthio-2'-cyanine is added 11 parts of 1% sodium carbonate in which has been dissolved 1.2 parts of the following magenta azo dye intermediate:

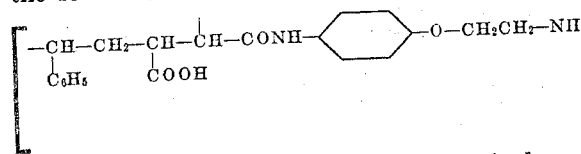
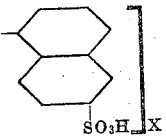

The preparation of this dye intermediate is described in Example II of Kirby and Woodward application Serial No. 450,146 filed July 8, 1942.

(3) To 100 parts of silver bromide emulsion sensitive only to blue light is added a solution of 1.8 parts of a polyvinyl acetal of salicylaldehyde and sulfobenzaldehyde in 8 parts of water which has been neutralized to a pH of about 7.2 by addition of 5% sodium carbonate solution. This yellow azo dye intermediate has the following probable type of structure:

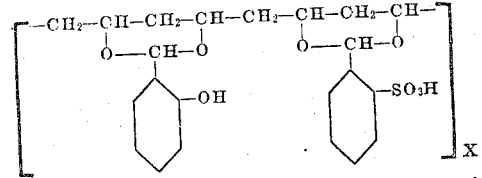

The preparation of this dye intermediate is given in U. S. P. 2,310,943.

Emulsion 1 is applied to a cellulose acetate safety film base carrying on the back an antihalation layer. After drying, the emulsion is coated with a 3% gelatin solution at 35° C., dried and coated with Emulsion 2. On top of this is coated a 4% gelatin solution containing yellow silver which absorbs all light above 485 millimicrons and prepared by reducing silver nitrate in an aqueous-gelatin solution with phenylhydrazine and washing away any excess of the hydrazine, and after drying Emulsion 3 is coated above the yellow filter. After exposure in a camera to an object to be recorded, this film is processed according to the following procedure:

1. The film is developed for about 12 minutes at 20° C. in a developer containing per 1000 parts of water 4 parts of 2-hydroxy-5-aminobenzenesulfonic acid, 10 parts of sodium hydroxide, 2 parts of sodium sulfite and 1.5 parts of potassium bromide. The film is then washed for 30 minutes and dried.

2. The film is next placed in a diazonium solution prepared as follows: 1.73 parts of 2-chloro-4-nitroaniline dissolved in 5 parts of concentrated sulfuric acid is mixed with 0.7 part of sodium nitrite dissolved in 5 parts of concentrated sulfuric acid and, after thoroughly mixing, this solution is poured with rapid stirring into a mixture of 600 parts of water and 400 parts of ice. Following this, 15 parts of sodium acetate and 7 parts of calcium hydroxide are added and the solution filtered by gravity to remove the calcium sulfate and excess ice and used at 0–5°. After 2 minutes in this solution, the film is placed in 1 molar hydrochloric acid at 5° C.

3. The silver and developer coupling product are next bleached by immersing for 10 minutes at 15° C. in a bleach bath of the following composition: Dissolve 10 parts of copper sulfate pentahydrate in 80 parts of water, then dissolve 5 parts of potassium bromide and add 5 parts of concentrated hydrochloric acid.

4. After washing in water 10 minutes the film is fixed and hardened in a standard potassium alum-thiosulfate bath, washed and dried to give a full color reproduction of the object photographed.

The film element is not limited to the specific dye intermediates used in this example. In Emulsion 1, for instance, other high molecular weight immobile 1-alkylamino-5-naphthols may be used and, in fact, the hydroxyl may be in the 8-position as 1-alkylamino-8-naphthols have equal utility. When the N-alkyl group forms part of a ring joined to the 2-position as in the case of the following compound which yields a blue-green with 2,4 dinitroaniline,

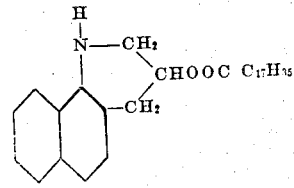

the hydroxyl group is not necessary although in general it must be present in the 5- or 8-position to yield the proper shade. Other intermediates of this type suitable for use are described in copending applications Serial No. 335,416, filed May 15, 1940, now U. S. P. 2,297,732, and Serial No. 395,496, filed May 27, 1941. Any method of immobilization previously mentioned may be used providing the naphthylamine retains its basic 1-amino group.

The magenta intermediate for Emulsion 2 may be chosen from any 1-naphthylamine with a coupling position available ortho or para to the amino group which must be primary or secondary or a 2-naphthylamine may be used, provided it has an alpha-hydroxyl group in the other ring to permit coupling with the developer oxidation product.

In choosing the best derivative of these preferred dye intermediate classes for producing the blue-greens and magenta from the naphthylamines and aminonaphthols, if the most nearly correct three-color reproduction is to be obtained it is desirable to prepare the dye in the film and determine its spectral transmission-absorption curve. Visual inspection is not sufficiently accurate and no definite rules can be formulated in azo dye chemistry for predetermining the exact shade of color that will be produced by the combination of a given coupling component and diazonium compound.

The least critical dye intermediate is the yellow intermediate of Emulsion 3 and, in place of the one used, other immobile phenols containing coupling positions and immobilized as described above may be used. In addition, active methylene compounds such as pyrazolones, including m-stearoylamino-phenylmethylpyrazolone, which, in fact, is one of the preferred intermediates, and immobile acetoacetamides such as 2-dodecyl-6-acetoacetaminobenzoic acid and related well known active methylene color formers immobilized as described above may be used as the yellow dye intermediate. These active methylene groups have a hydrogen atom replaceable by an alkali metal in aqueous solution and derive their reactivity by reason of the fact that they are attached by a single valence directly to one of the following unsaturated groups:

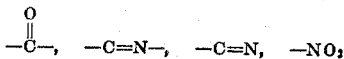

the remaining valence of the active methylene group being also attached to one of these groups directly or through an even numbered conjugated double bond system. The selection of a good yellow azo dye intermediate is, in general, much easier than the selection of the magenta and blue-green dye intermediate as most of the yellow dyes which look good visually are found to absorb most of the light of wave length greater than 490 millimicrons while transmitting strongly below this limit.

All of the compounds of the above example contain solubilizing groups and are soluble in water or dilute aqueous sodium carbonate solution. Such compounds are pre-preferred because of (1) their ease of incorporation in the emulsion and (2) the brilliance and clarity of the resulting film. It is possible, however, to use water- and sodium carbonate-insoluble dye intermediates. Such compounds may be dissolved in caustic alkali solution, incorporated in the emulsion, and the resulting mixture neutralized. They may be added in organic solvent solutions or ground to a fine state and dispersed in the emulsion. A method using such compounds has been described in British Patent 503,824 and this invention is useful with such intermediates. In fact, the film element and treatment with the diazonium solutions of this invention may be applied to any process where it is desirable to form all three subtractive primary colors at one time in a film element. As an additional example, the film element of this invention may be used in a process where, after normal exposure and non-coupling development, the colors are formed by coupling evenly over the whole film area, then bleached differentially by action of a catalytic bleach bath in conjunction with the silver image or residual silver salt image which may be reduced to silver after removal of the original negative image to form azo dye images.

The exact film structure of the example is not required in this invention, but the layers may be reversed in order of application with exposure through the base or ore layer placed on one side of the support and two on the other, or the emulsion may be dispersed into fine hard particles, mixed together, providing, of course, that three dye intermediates as described above are incorporated one with each emulsion. Further, the emulsion may be placed on other bases, such as cellulose nitrate, glass or opaque materials for making color prints, etc.

Of course, the multi-emulsion material may be used in other ways than by exposure in a camera. Thus, it may be used as a printing material for contact or projection printing from color transparencies or color separations using colored light.

The development step may also be varied considerably and any of the various color developing agents and solutions mentioned in application Serial No. 335,416, now U. S. P. 2,297,732, of which this application is a continuation-in-part, may be employed. Also, as in aforesaid application, the film may be developed first in a non-coupling developer such as the N-monoalkyl-p-aminophenol and hydroquinone developers, etc., the residual silver salts fixed out, then re-exposed or chemically fogged and the process of the example carried out, thus yielding a color negative in which all the colors are complementary to the colors of the object to which the film was exposed.

The diazonium compounds to be used are not limited to that used in the example, as clearly taught above. Although the 2-position preferably is occupied by a member of the group consisting of nitro, halogen, and trifluoromethyl, other groups possessing atoms joined directly to the nucleus or separated by not more than one atom and having at least four electrons not shared with another atom when present in the 2-position are within the scope of the present invention. Such groups have been found to provide a bathochromic effect on the dye, i. e., they shift the absorption spectrum to longer wave lengths and improve the color saturation. These groups include the following: sulfonic acid, carboxylic acid, methoxy, ethoxy, sulfone, acetyl, etc. Diazonium compounds containing, in addition to the preferred 2-substituent, one of the same substituents in other positions, i. e., 3, 5, or 6, are considered within the scope of this invention since such groups have no great effect on the dye but mainly reinforce the effect of the original 2-substituent. Likewise, the introduction of alkyl groups into the preferred diazonium compound have little effect on the final dye.

The methods of preparing the diazonium solutions described above are well known, conventional procedures. Other ordinary methods known in organic chemistry can be used in like manner. Thus, in case of water soluble compounds containing a sulfonic acid group, the diazotization may occur in dilute mineral acid. The concentrated sulfuric acid used to dissolve the amine in the example of this invention may be replaced by other acids as long as there is sufficient mineral acid present to effect the diazotization. Thus, as a solvent we may use glacial acetic acid or phosphoric acid. It is better to use these solutions below 5° C. and keep them protected from the light as both increased temperature and light cause decomposition of diazonium compounds. The optimum concentration and pH will vary considerably depending upon the choice of diazonium compound and coupling component but will be, in general, from about 0.1 to 0.001 molar and preferably between about 0.05 and 0.005 molar, while the pH should be between 1 and 7 and may be adjusted by the use of other alkaline reacting salts including sodium, potassium, lithium, magnesium, calcium, etc., acetates, propionates, citrates, carbonates, phosphates, hydroxides, and the like.

The remainder of the processing steps are the same as those given in our application Serial No. 335,416, now U. S. P. 2,297,732, and the azo coupling step may occur subsequent to bleaching or fixing, that is, at any suitable stage in the operation subsequent to color coupling.

As many apparently widely different embodiments of this invention may be made without departing from the spirit and scope thereof, it is to be understood that the invention is not limited to the specific embodiments thereof except as defined in the appended claims.

I claim:

1. A photographic color process which comprises exposing to light from a colored object a photographic element bearing a plurality of differentially sensitized emulsion layers each having in operative contact therewith an immobile color former capable of forming (1) an azo dye which is complementary in color to the utilized sensitivity of the respective emulsion layer and (2) a dye selected from the group consisting of quinoneimine and azomethine dyes, developing said exposed element with a color coupling developing agent, treating said element with a solution of a diazotized 4-nitro-aniline containing a 2-substituent taken from the class of atoms having in their outer shell four or more electrons which are not shared with another atom and atoms having directly attached thereto atoms having four or more electrons which are not shared with another atom, decolorizing the dyes formed in said color development step, and removing the silver and silver salts subsequent to said development.

2. A process as set forth in claim 1 wherein three emulsions are used which are sensitive to the blue, green and red regions of the spectrum and the blue-green immobile dye intermediate used with the red sensitized emulsion is taken from the group consisting of 1-N-alkylamino-5-naphthols and 1-N-alkylamino-8-naphthols.

3. A process as set forth in claim 1 wherein three emulsions are used which are sensitive to the blue, green and red regions of the spectrum and the magenta immobile dye intermediate used with the green sensitized emulsion is taken from the group consisting of 1-naphthylamines and 2-naphthylamines.

4. A photographic process which comprises exposing to light from a colored object a photographic element bearing a plurality of differentially sensitized emulsion layers each having in operative contact therewith an immobile color former capable of forming (1) an azo dye which is complementary in color to the utilized sensitivity of the respective emulsion layers and (2) a dye selected from the groups consisting of quinoneimine and azomethine dyes, said color former being a colloid containing a substituent taken from the group consisting of sulfonic and carboxylic acid radicals and water soluble salts thereof which is further characterized by being soluble to the extent of at least 0.5% in 5% aqueous sodium carbonate at 25° C., developing said exposed element with a color coupling developing agent, treating said element with a solution of a diazotized 4-nitroaniline containing a 2-substituent taken from the class of atoms and atoms having directly attached thereto an atom having in its outer shell four or more electrons which are not shared with another atom, decolorizing the dyes formed in said color development step, and removing the silver and silver salts subsequent to said development.

5. The process which comprises treating an exposed multilayer color film containing three silver halide emulsion layers which are so disposed and sensitized that their utilized sensitivities are in the blue, green, and red regions of the spectrum, said respective layers having in operative association therewith immobile dye intermediates capable of forming (1) an azo dye which is complementary in color to the utilized sensitivity of the respective emulsion layer and (2) a dye selected from the group consisting of quinoneimine and azomethine dyes, said dye intermediates being taken from the group consisting of (a) substituted 1-amino-5-naphthols and substituted 1-amino-8-naphthols, (b) substituted 1-naphthylamines, substituted 1-naphthols, and substituted 2-aminonaphthols, and (c) substituted phenols and active methylene compounds, developing said exposed element with a color coupling developing agent, treating said element with a solution of a diazotized 4-nitroaniline containing in the 2-position a substituent taken from the class consisting of halogen atoms, nitro sulfonic acid, carboxylic acid, trifluoromethyl, and alkoxy groups, decolorizing the dyes formed in said development step, and removing the silver and silver salts subsequent to said development.

6. The process which comprises treating an exposed multilayer color film containing three silver halide emulsion layers which are so disposed and sensitized that their utilized sensitivities are in the blue, green, and red regions of the spectrum, said respective layers having in operative association therewith immobile dye intermediates capable of forming (1) an azo dye which is complementary in color to the utilized sensitivity of the respective emulsion layer and (2) a dye selected from the group consisting of quinoneimine and azomethine dyes, said intermediates being colloids containing a substituent taken from the group consisting of sulfonic and carboxylic acid radicals and the water soluble salts thereof which are further characterized by being soluble to the extent of at least 0.5% in 5% aqueous sodium carbonate at 25° C., said dye intermediates being taken from the group consisting of (a) substituted 1-amino-5-naphthols and substituted 1-amino-8-naphthols, (b) substituted 1-naphthylamines, substituted 1-naphthols, and substituted 2-aminonaphthols, and (c) substituted phenols and active methylene compounds, developing said exposed element with a color coupling developing agent, treating said element with a solution of a diazotized 4-nitroaniline containing in the 2-position a substituent taken from the class consisting of halogen atoms, nitro-sulfonic acid, carboxylic acid, trifluoromethyl, and alkoxy groups, decolorizing the dyes formed in said development step, and removing the silver and silver salts subsequent to said development.

7. A photographic color process which comprises exposing to light from a colored object a photographic element bearing three differentially sensitized silver halide emulsion layers which are sensitive to the blue, green, and red regions of the spectrum and each having in operative contact therewith an immobile color former capable of forming (1) an azo dye which is complementary in color to the utilized sensitivity of its respective emulsion layer, and (2) a dye selected from the group consisting of quinoneimine and azomethine dyes, the blue-green dye intermediate used with the red sensitized emulsion layer being a 1-amino-naphthol of the general formula:

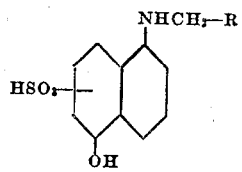

wherein R is an organic group of such molecular weight and structure that it renders said compound immobile in water permeable colloid layers; developing said exposed element with a color coupling developing agent, treating said element with a solution of a diazotized 4-nitroaniline containing a 2-substituent taken from the class of atoms having in their outer shell four or more electrons which are not shared with another atom and atoms having directly attached thereto atoms having four or more electrons which are not shared with another atom, decolorizing the dyes formed in said color development step, and removing the silver and silver salts subsequent to said development.

8. The process which comprises treating an exposed multilayer color film containing three silver halide emulsion layers which are so disposed and sensitized that their utilized sensitivities are in the blue, green, and red regions of the spectrum, said respective layers having in operative association therewith immobile dye intermediates capable of forming (1) an azo dye which is complementary in color to the utilized sensitivity of the respective emulsion layer and (2) a dye selected from the group consisting of quinoneimine and azomethine dyes, said dye intermediates being taken from the group consisting of (a) substituted 1-amino-5-naphthols and substituted 1-amino-8-naphthols, (b) substituted 1-naphthylamines, substituted 1-naphthols, and substituted 2-aminonaphthols, and (c) substituted phenols and active methylene compounds, developing said exposed element with a color coupling developing agent, treating said element with a solution of a diazotized 2-chloro-4-nitroaniline, decolorizing the dyes formed in said development step, and removing the silver and silver salts subsequent to said development.

9. The process which comprises treating an exposed multilayer color film containing three silver halide emulsion layers which are so disposed and sensitized that their utilized sensitivities are in the blue, green, and red regions of the spectrum, said respective layers having in operative association therewith immobile dye intermediates capable of forming (1) an azo dye which is complementary in color to the utilized sensitivity of the respective emulsion layer and (2) a dye selected from the group consisting of quinoneimine and azomethine dyes, said dye intermediates being taken from the group consisting of (a) substituted 1-amino-5-naphthols and substituted 1-amino-8-naphthols, (b) substituted 1-naphthylamines, substituted 1-naphthols, and substituted 2-aminonaphthols, and (c) substituted phenols and active methylene compounds, developing said exposed element with a color coupling developing agent, treating said element with a solution of a diazotized 2,4-dinitroaniline, decolorizing the dyes formed in said development step, and removing the silver and silver salts subsequent to said development.

10. A photographic color process which comprises exposing to light from a colored object a photographic element bearing three differentially sensitized silver halide emulsion layers which are sensitive to the blue, green, and red regions of the spectrum and each having in operative contact therewith an immobile color former capable of forming (1) an azo dye which is complementary in color to the utilized sensitivity of its respective emulsion layer, and (2) a dye selected from the group consisting of quinoneimine and azomethine dyes, the magenta immobile dye intermediate used with the green sensitized emulsion layer being a naphthylamine taken from the group consisting of 1-naphthylamines and 2-naphthylamines of the general formula:

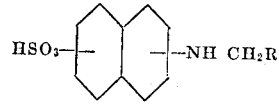

wherein R is an organic group of such molecular weight and structure that it renders said compound immobile in water permeable colloid layers; developing said exposed element with a color coupling developing agent, treating said element with a solution of a diazotized 4-nitroaniline containing a 2-substituent taken from the class of atoms having in their outer shell four or more electrons which are not shared with another atom and atoms having directly attached thereto atoms having four or more electrons which are not shared with another atom, decolorizing the dyes formed in said color development step, and removing the silver and silver salts subsequent to said development.

DAVID W. WOODWARD.